2,745,789

ULTRASONIC IRRADIATION IN PREPARATION OF MALT

Walter Specht, Ludwigstadt, and Hermann Schultheis, Weissenthurm (Rhine), Germany No Drawing. Application November 1, 1951, Serial No. 254,449

Claims priority, application Germany June 26, 1951

2 Claims. (Cl. 195—71)

The invention relates to a method of stimulating and increasing the germinating power of seeds, particularly of seeds of cereals, so as to promote the growth and obtain other advantages.

The invention consists essentially in subjecting seeds of cereals in the presence of liquids, for instance in the form of an aqueous suspension to ultrasonic irradiation.

More specifically, the invention consists in applying such ultrasonic irradiation to seeds of barley during, or subsequent to, the steeping process for the production of malt.

In the production of malt, the grain is steeped into water and allowed to germinate to a certain degree of growth of the corns, "ripeness," which is considered attained when e. g. barley has a water content of 43 to 45 per cent. Barley with a water content of 43 per cent is suitable for the production of pale malt, and with a water content up to 45 per cent for the production of dark malt.

Generally, the steep is carried out at a temperature of about 11 to 15° C. and is terminated after 60 to 90 or 100 hours.

If the grains, e. g. brewery barley, is subjected to ultrasonic irradiation after the steeping under water has been completed, the germination of the irradiated barley is considerably accelerated, for instance by 36 to 48 hours, and at the same time the growth is promoted.

We have also found that seeds of cereals, such as barley and the like, which have not yet steeped to ripeness and have not yet the required germinating power and capacity, can be considerably improved with respect to their germinating capacity and power and their growth by a treatment with ultrasonic waves.

The sonoration is preferably carried out at room temperature with ultrasonic waves of high frequency. Piezoelectric frequency generators can be used which transmit at 1000 kHz. about 300 watts ultrasonic energy to the material suspended in water. During the irradiation, the steeped material is preferably recycled. The irradiation should not be excessively prolonged; we apply generally the irradiation over a period of about 30 to 150 min. The germinating capacity of steeped grains is already considerably increased by a sonoration of about 30 to 60 min.

The sonoration in presence of water may be compared to a washing process in which at the same time impurities are dissolved out and objectionable taste is removed.

The following examples, which are to be understood as not to limit the invention, are given to illustrate the invention more in detail.

Example 1

Barley was steeped at 15° C. (without addition of lime water) for 16 hours and subsequently irradiated for 30 min. by means of a rotating ultrasound generator in form of a piezo-electric frequency generator (1000 kHz., 300 watt, ultrasonic energy). During germination, the room temperature was kept at 17° C.

The following table shows the results compared with barley steeped without sonoration for 60 and 16 hours.

| Time of Germination | Grain steeped 60 hours without sonoration | | Grain steeped 16 hours | | | |
|---|---|---|---|---|---|---|
| | | | Without sonoration | | With 30 min. sonoration | |
| | Germinated, percent | Not Germinated, percent | Germinated, percent | Not Germinated, percent | Germinated, percent | Not Germinated, percent |
| 1 day | 76 | 24 | 8 | 92 | 91 | 9 |
| 2 days | 83.1 | 16.9 | 77 | 23 | 94.7 | 5.3 |
| 3 days | 86.6 | 13.4 | 78 | 22 | 96 | 4 |
| 4 days | 88.4 | 11.6 | 78.7 | 21.3 | 97 | 3 |
| 5 days | 89.4 | 10.6 | 79 | 21 | 97 | 3 |
| Germinating power, percent | 86.6 | | 78.0 | | 96 | |
| Germinating capacity, percent | 89.4 | | 79.0 | | 97 | |

The examination of the germination and growth stages involved the continuous observation of the development of sprouts and roots of the green malt. The results given in the above table show clearly the advantage accomplished by the sonoration according to the invention. We believe that the effect of the ultrasonic waves of high frequency can be explained by the cavitation-increased permeability of the outer cell layers of the grain, which in turn promotes the physiological-chemical dissolution processes; this shows in the shortening of the steeping time and the promotion of growth. The shortened germination time reduces, in addition, the losses by respiration.

Therefore, our novel method presents important advantages in the steeping, germination and dissolving process, which result in a simplification and economy of the operation and allow of reducing the working space and increasing the capacity of the plant.

We have further found that the sonoration of steeped grain such as barley and the like increases also the extract yield. Our experiments have shown that the kiln-dried malt obtained from irradiated steeped grain has a modified composition which results in worts (congress worts) having an extract content which is usually about 1.5 per cent (waterfree) higher than in worts prepared from corresponding non-irradiated worts. For increasing the yield of extracts, we have found a sonoration of completely steeped and ripe grain for a period of about 50 to 150 min. and more very suitable.

The albumin fractions (total albumin, high molecular proteins, fomol nitrogen compounds) of irradiated malts are not adversely affected and correspond to the albumin fractions of non-irradiated malt. Also, the diastatic power of irradiated malt corresponds to that of corresponding non-irradiated malt, which is important with respect to the brewing properties. Worts prepared from irradiated and from corresponding non-irradiated malts show identical color and pH values.

An examination of the 1000 grain weight does not show differences between irradiated and non-irradiated malts. The hectoliter weight decreases to a small extent in irradiated malts. This is in conformance with a small decrease in albumins, which might be due to the release of gluten proteins.

The irradiation is preferably carried out in the steeping vat. If the grain is steeped to ripeness, it is irradiated before the steeping water is drained off. If the grain has been steeped for a shorter time, for instance 20 hours, and is then irradiated, the steeping may then be completed in the steeping vat.

Example 2

A batch consisting of 3 t. of barley (Palatine barley) was steeped for 59 hours to ripeness and then subjected in the steeping vat under water to ultrasonic irradiation for a period of two hours with agitation of the steeped material. The agitation may be effected, for instance, by injecting air from the bottom of the steeping vat. The immersion ultrasound generator transmitted to the steep about 300 watt ultrasonic energy at a frequency of 1000 kHz. After the sonoration, the steeped grain was placed on the floor in the conventional manner. The extract content of the malt prepared from the irradiated steeped material was 78.25% (calculated on 100 g. of dry malt substance) whereas the extract content of malt prepared in the same way but without irradiation was only 76.53%. The irradiation according to our method resulted, therefore, in an increase of 1.72% extract (calculated on 100 g. of dry malt substance).

*Example 3*

A batch consisting of 5.5 t. of barley (Palatine barley) was steeped for 25 hours and then subjected in a steeping vat under water to ultrasonic irradiation for a period of 90 min. under the same conditions as described in Example 2. Afterwards it was after-steeped in the same vat for a period of 43 hours. The total steeping time was, therefore, 68 hours until ripeness.

The extract content of the malt prepared from the irradiated material was 80.55% (calculated on 100 g. of dry malt substance). A control batch of the same barley steeped for 68 hours without intermediate irradiation furnished a malt with an extract content of only 79%, i. e. the method of the invention increased the extract content by 1.55% (calculated on dry malt substance).

Advantages are also obtained when the grains are irradiated after a shortened steeping period of about 24 to 40 hours (instead of 60–90 hours for complete steeping) and then immediately removed and further processed in the conventional manner. In this way, an increase of about 2 to 3% of the malt yield by weight can be attained.

If barley or the like is steeped to "ripeness" and then subjected to ultrasonic irradiation, no substantial increase by weight of the malt yield can be observed. If, however, the sonoration is carried out before the steeping is completed, the advantages recited above with regard to an increase of the malt yield are obtained. The same is true of batches which subsequently to a first irradiation applied, for instance after a steeping of 25 hours, are then, for instance after-steeped for 40 hours to obtain "ripeness."

This embodiment may be carried out, by way of example, as follows:

The grain lying in the steeping vat under water is steeped for a period of about 20 to 40 hours and then subjected to ultrasonic irradiation for a period of 50 to 150 min. or under certain circumstances even longer. Then the material is either at once removed from the steeping vat or after-treated in the same vat until "ripeness" has been reached. All operations may be carried out at room temperature.

The obtained results are illustrated by the following tables:

*Example 4*

| Batch | Malt | | |
|---|---|---|---|
| | Total amount in kg. | Yield in percent | Increase in percent |
| Complete steeping, 68 hours, no sonoration | 2,324 | 77.8 | |
| 40 hours steeping, 90 min. sonoration | 2,388 | 79.6 | 2.8 |
| 20 hours steeping, 120 min. sonoration | 2,395 | 79.8 | 3.1 |

*Example 5*

| Batch | Barley, t. | Malt | |
|---|---|---|---|
| | | hl. weight in kg. | increase in percent |
| Complete steeping, no sonoration | 5.5 | 56.5 | |
| 25 hours steeping, 90 min. sonoration, 68 hour after-steeping | 4.0 | 58.1 | 2.7 |

In addition to the economic and technical advantages set forth, the novel method has the biological advantage that the ferment content, especially the diastatic power of the irradiated malt, increases, which has a favorable influence on the brewing process. In Example 5, for instance, the diastatic power increases from 335.2 DK waterfree of the non-irradiated malt to 369.7 of the irradiated malt.

The raw maltose content of the malt is not substantially changed by the sonoration.

Although we have described our invention, setting forth specific embodiments thereof, the invention is not limited to the details described. It will be understood by those skilled in the art that the novel method is susceptible of considerable variations and our invention is not to be limited except by the scope of the claims appended hereto.

We claim:

1. In the preparation of malt, the method of improving the germinating properties and increasing the yield by weight of the barley grain, comprising steeping the grain for a shortened period of only about 20 to 40 hours instead of about 60 to 100 hours required for ripeness, subjecting then the steeped grain in the steep to ultrasonic irradiation of high frequency for about 30 to 150 min. and discontinuing subsequently the steeping treatment.

2. In the preparation of malt, the method of improving the germinating properties of barley grain comprising steeping the grain for an extended period of time but insufficient for obtaining ripeness of the grain, then subjecting the steeped grain in the steep to ultrasonic irradiation of high frequency for about 50 to 150 min. and subsequently maintaining the irradiated grain in the steep until the desired ripeness is obtained.

References Cited in the file of this patent

UNITED STATES PATENTS

| 896,752 | Oretel | Aug. 25, 1908 |
| 2,064,522 | Davis | Dec. 15, 1936 |

FOREIGN PATENTS

| 874,265 | France | Apr. 27, 1942 |
| 310,670 | Italy | Aug. 30, 1933 |
| 400,377 | Italy | Dec. 10, 1942 |
| 228,153 | Switzerland | Oct. 16, 1943 |

OTHER REFERENCES

Siebel: Technical Review, vol. 10, April 1936, page 104.
"The Use of Ultrasonic Energy in Agriculture" by Campbell & Schoenleber, pub. May 1949 in Agricultural Engineering (magazine), vol. 30, pages 239–241.